(No Model.) 3 Sheets—Sheet 3.

F. L. McGAHAN.
FRICTION GEARING FOR DYNAMOS.

No. 455,488. Patented July 7, 1891.

Witnesses
H. D. Nealy
E. P. Griffith

Inventor
Fred L. McGahan.
By his Attorney
C. P. Jacobs.

United States Patent Office.

FREDERICK L. McGAHAN, OF INDIANAPOLIS, INDIANA.

FRICTION-GEARING FOR DYNAMOS.

SPECIFICATION forming part of Letters Patent No. 455,488, dated July 7, 1891.

Application filed December 26, 1890. Serial No. 375,847. (No model.)

*To all whom it may concern:*

Be it known that I, FREDERICK L. MCGAHAN, of Indianapolis, county of Marion, and State of Indiana, have invented certain new and useful Improvements in Friction-Drives for Dynamos; and I do hereby declare that the following is a full, clear, and exact description thereof, reference being had to the accompanying drawings, in which like figures refer to like parts.

My invention relates to improvements in the construction of friction-drives for dynamos, and will be understood from the following description.

Figure 1:
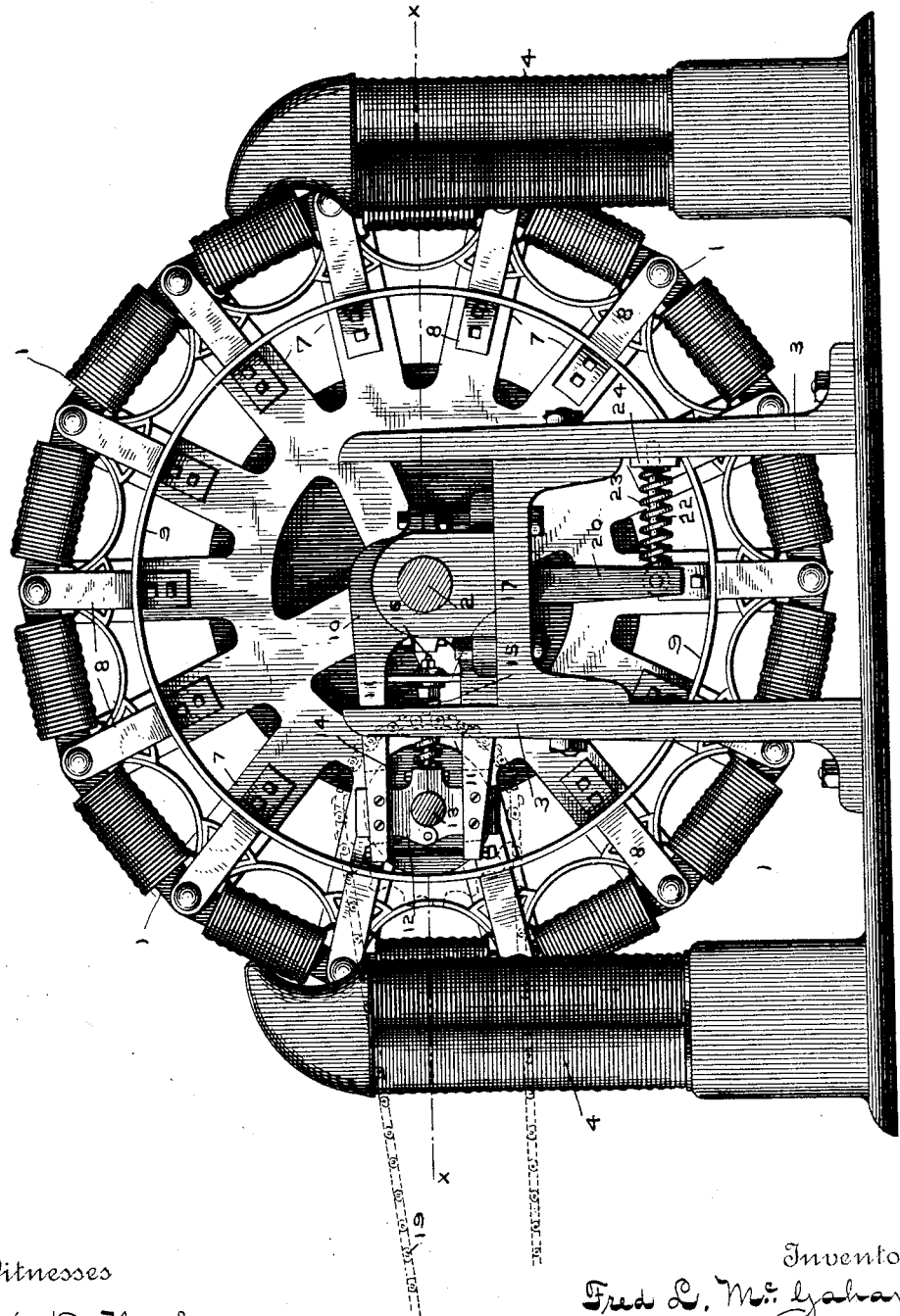
Figure 2:
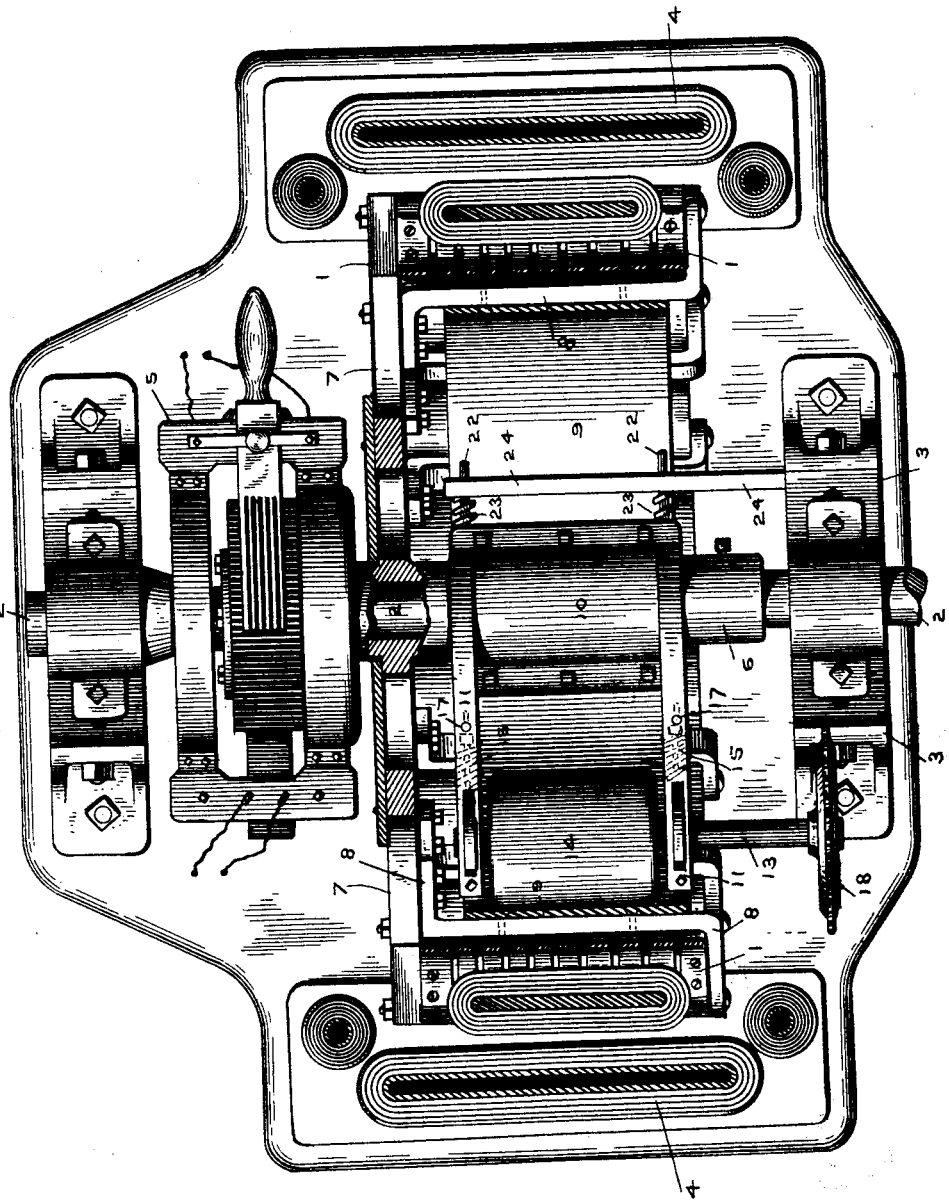
Figure 3:
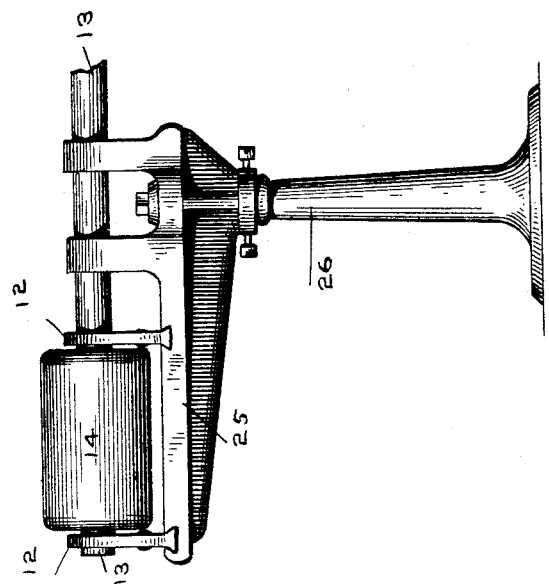
Figure 4:
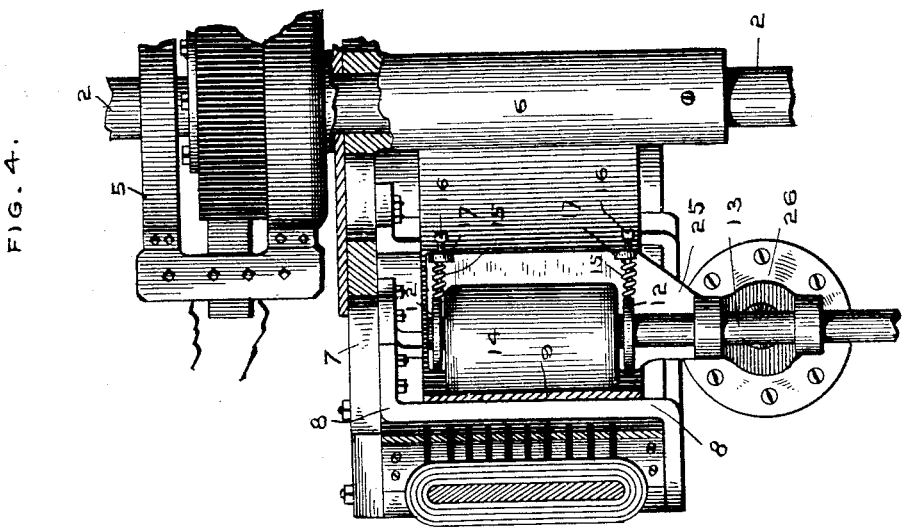

In the drawings, Figure 1 is a side elevation. Fig. 2 is a section on the line $x\,x$, Fig. 1, the friction-wheel and its supporting-bracket being in full lines. Fig. 3 is an elevation of a modified form of support for the friction-roll. Fig. 4 is a top plan view of the same.

In detail, 1 is an armature mounted on a shaft 2, having bearings in a frame-work 3, and 4 are the field-magnets.

5 is the brush-frame, mounted upon the shaft outside the armature. No stress is herein laid on the construction of the coils of the armature or the manner in which their wires and those of the field-magnets are connected to the commutator and brushes. This may be done in any convenient manner, my invention not relating particularly to these.

6 is the hub, and 7 are the spokes, of the armature-wheel, which is rigidly mounted on the shaft and revolves with it.

8 are the brackets bolted to the spokes and shouldered to form supports for the circular plate 9, secured thereto by means of screws or in any other convenient manner.

10 is a sleeve-casting loosely mounted on the hub of the armature, having upper and lower arms 11, which carry adjustable boxings 12 at their outer ends, providing bearings for the shaft 13, on which is mounted the friction drive-roll 14. Outside each end of the friction-roll and bearing centrally against the boxings thereof are springs 15, coiled on rods 16, whose inner ends bear against plates 17, giving an elastic bearing to the friction-roll. On an extension of the shaft 13 of the friction-roll is mounted a sprocket-wheel 18, from which a drive-chain 19 leads to a motor.

Depending from the sleeve-casting 10 are arms 20, to which are pivoted at 21 rods 22, on which are coiled springs 23, the ends of the rods passing through a plate 24, bolted to the frame-work, the object of this device being to maintain the friction-roll and its frame-work in a horizontal position, the spring connected to the depending arm providing an elastic backing and preventing any jolting or jarring of the mechanism during its operation.

In Figs. 3 and 4 I show a modified form of the support for the friction-roll. Here the shaft of this roll is carried in bearings on a bracket 25, supported on a pillar 26, the latter being set at one side of the armature and not connected in any manner with the hub or shaft. In other respects the devices are the same, the only difference between the two being that in Fig. 1 the friction-roll is supported by a bracket mounted on the main shaft, and in Figs. 3 and 4 it has an independent support.

The shaft of the friction-roll (shown in Figs. 3 and 4) may be connected by suitable mechanism directly with the engine-shaft, or may be driven by a sprocket-wheel mounted thereon in a similar way to the one shown in Fig. 1.

It is obvious that the several parts of the device may undergo modifications as to form without departing from the principle of my invention, which is to carry in suitable bearings a friction-roll at one side of the main shaft and hold it in contact with a friction-plate connected to the armature, whereby the latter is directly driven.

What I claim as my invention, and desire to secure by Letters Patent, is the following:

1. In a dynamo, an armature rigidly mounted on a shaft having bearings in a frame-work, and a circular ring or plate connected to such armature between the bobbins and the shaft, in combination with a friction-roll journaled in bearings at one side of the armature-shaft and adapted to contact with the inner face of the circular plate for driving the armature, substantially as shown and described.

2. In a dynamo, an armature mounted on a shaft having bearings in a frame-work and provided with a friction-plate between the bobbins and the shaft, in combination with a friction-roll journaled in adjustable boxings at one side of the main shaft and flexibly supported thereon, its periphery adapted to contact with the inner face of the friction-plate of the armature for directly driving the same, substantially as shown and described.

3. In a dynamo, an armature mounted on a shaft having bearings in the frame-work, a friction-plate connected thereto between the bobbins and the shaft, and a friction-roll sustained by a suitable support at one side of the armature and adapted to contact with its friction-plate for driving the same, in combination with each other and with mechanism for driving the friction-roll, substantially as shown and described.

4. In an electric generator, an armature composed of a hub revolving upon a shaft suitably mounted in bearings in the frame-work, spokes connected to such hub, the periphery composed of a series of bobbins or coils for generating a current, a friction-ring secured to the armature between the bobbins and the shaft, field-magnets on either side of such armature, the wires of the coils and of the field-magnets connected to each other and to the brushes and commutator in any suitable manner, and a friction-wheel carried on a shaft at one side of the armature-shaft and adapted to contact directly with the inner face of the armature-ring for driving the same, in combination with actuating mechanism, substantially as shown and described.

In witness whereof I have hereunto set my hand this 20th day of December, 1890.

FRED. L. McGAHAN.

Witnesses:
E. B. GRIFFITH,
H. D. NEALY.